United States Patent Office 3,484,474
Patented Dec. 16, 1969

3,484,474
NOVEL SULFATION OF SECONDARY ALCOHOLS AND NOVEL SULFATION PRODUCT
Horst-Jurgen Krause, Dusseldorf-Holthausen, Germany, assignor to Henkel & Cie. G.m.b.H., Dusseldorf-Holthausen, Germany, a corporation of Germany
No Drawing. Filed Dec. 28, 1966, Ser. No. 605,172
Claims priority, application Germany, Jan. 25, 1966,
H 58,334
Int. Cl. C07c *141/02, 139/00*
U.S. Cl. 260—459      7 Claims

ABSTRACT OF THE DISCLOSURE

The invention relates to an improved process of sulfating secondary alkyl alcohols with an adduct of chlorosulfonic acid and acid mono- or di-esters of phosphoric acid.

PRIOR ART

Sulfates of secondary alcohols, particularly long-chain secondary alkyl alcohols, are excellent washing, wetting and foaming agents. Because the sulfates of straight-chain secondary alkyl alcohols are especially distinguished by their rapid and complete biological degradation, they have gained considerable significance and interest. The simplest and most convenient process for the preparation of sulfates of secondary alkyl alcohols begins with the sulfation of the alcohols with the usual sulfating agents such as concentrated sulfuric acid, chlorosulfonic acid, oleum or sulfur trioxide, because only the substances which are necessary for the desired end product are present in this reaction. However, these methods of sulfation have the disadvantage that secondary alkyl alcohols easily split off water under the influence of strong acids and are converted into olefins and secondary products. Because of these undesirable secondary reactions, the final products are mixtures of various reaction products with very variable degrees of sulfation which result in poor color values and unfavorable characteristics which affect their use.

To avoid these secondary reactions, British Patent No. 942,130 suggests sulfating organic compounds having reactive hydrogen atoms in an inert solvent with a preformed complex of sulfur trioxide or compounds which will form or liberate sulfur trioxide with organic esters of an oxy acid of phosphorus such as phosphite, phosphinite, phosphinate, phosphate, phosphonate, phosphonite, pyrophosphate and metaphosphate esters, preferably the complex of sulfur trioxide and triethylphosphate. Numerous organic compounds such as amines, amides, enols, phenols, oximes, hydrazones, semicarbazones and primary, secondary and tertiary alcohols as well as olefins and aromatic hydrocarbons and their polymers may be sulfated with the said process. However, the use of the said preformed complexes has one great disadvantage, namely that the phosphoric acid ester portion cannot be separated from sulfated secondary alkyl alcohols reaction product by simple technical methods. This results not only in the loss of the relatively expensive phosphoric acid esters for further use but the ester is also usually detrimentally noticeable as an inert substance in the end product.

It is an object of the invention to provide a novel process for the sulfating secondary alkyl alcohols to obtain excellent surface active products without purification.

It is another object of the invention to provide novel sulfated secondary alkyl alcohol products which have superior surface active properties.

These and other objects and advantages of the invention will become obvious from the following detailed description.

The novel sulfation process of the invention comprises reacting secondary alkyl alcohols at temperatures between 20 and 40° C. with a complex of chlorosulfonic acid and at least one acid ester selected from the group consisting of mono and diesters of phosphoric acid having the formula

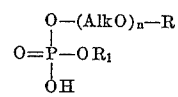

wherein R is an alkyl of 10 to 22 carbon atoms, $R_1$ is selected from the group consisting of hydrogen, methyl, ethyl and $-(AlkO)_n-R$, Alk is an alkylene of 2 to 3 carbon atoms and $n$ is an integer from 1 to 10, preferably 2 to 6 and neutralizing the resulting reaction mixture.

The sulfation is preferably conducted in a vacuum so that the nascent hydrogen chloride can be evacuated as soon as it is formed and the end product obtained after neutralization is as salt-free as possible. The complex is usually used in 95 to 105 mole percent of the secondary alkyl alcohol. Therefore, after the sulfation reaction is completed, the reaction is preferably maintained under vacuum for a short while, i.e., up to about one-half hour to assure substantially complete removal of the hydrochloric acid.

The sulfation reaction mixture is an acid mixture of the sulfates of the secondary alkyl alcohols and the mono- or diesters of phosphoric acid used to form the starting complex. The neutralization of this acid mixture may be effected with the usual neutralizing agents such as alkali metal hydroxides such as potassium hydroxide, sodium hydroxide; amines such as triethanolamine; alkali carbonates, etc. Sodium hydroxide is preferred because it is the most economical.

The complexes of chlorosulfonic acid and the acid mono- or diesters of phosphoric acid can be formed by adding approximately 1 mole of chlorosulfonic acid to 1 mole of the said acid ester of phosphoric acid with stirring and cooling. The temperature is preferably kept as low as the increasing viscosity of the complex will permit while still having a reaction and the preferred temperature is about 20 to 30° C.

The acid mono- and diesters of phosphoric acid used to form the sulfating complexes may be prepared in the usual fashion for phosphoric acid esters such as reacting about 1 to 3 moles of the fatty alcohol glycol ether or a mixture thereof with an alkanol of 1 to 2 carbon atoms with about 1 mole of phosphorus pentoxide or phosphorus oxychloride. The products obtained with phosphorus pentoxide are mostly mixtures of acid mono and diesters of phosphoric acid. A preferred sulfating complex is the reaction product of about 3 moles of the fatty alcohol glycol ether and about 1 mole of phosphorus pentoxide which is essentially a mixture of mono- and di-fatty alcohol glycol ether phosphates.

The fatty alcohol glycol ethers used to form the phosphoric acid ester are the condensation product of 1 to 10 moles of an alkylene oxide having 2 to 3 carbon atoms, preferably 2 to 6 moles of ethylene oxide, with 1 mole of a saturated fatty alcohol of 10 to 22 carbon atoms, preferably 12 to 18 carbon atoms. Mixtures of ethylene oxide and propylene oxide can also be used. Larger amounts of alkylene oxide can be used but more than 10 moles of alkylene oxide do not show any practical advantages. Examples of suitable saturated fatty alcohols are decanol, dodecanol, octadecanol, cetyl alcohol, lauryl alcohol, mixtures of alcohols derived from natural oils such as coconut oil, rape seed oil, etc.

The secondary alkyl alcohols to be sulfated by the process of the invention are straight or branched chain secondary alkyl alcohols of 8 to 22 carbon atoms, but the straight chain secondary alkyl alcohols are of particular interest due to their exceptional biological degradation, and are easily accessible in good yields by controlled oxidation of straight chain paraffins. Examples of suitable secondary alcohols are decanol-2, octanol-2, decanol-4, dodecanol-6, and mixtures of secondary alkyl alcohols from oxidation of paraffins.

In the following examples, there are described several preferred embodiments to illustrate the invention. However, it should be understood that the invention is not intended to be limited to the specific embodiments.

EXAMPLE I 35.5 parts by weight of phosphorus pentoxide were added in small portions with stirring to 208 parts by weight of a commercial condensation product of two moles of ethylene oxide with one mole of a mixture of fatty alcohols of 12 to 14 carbon atoms and the resulting reaction mixture was heated to 75 to 80° C. for 10 hours. Then the reaction mixture was cooled to 23 to 25° C. and 61.2 parts by weight of chlorosulfonic acid were added dropwise with stirring while cooling to maintain the said temperature, after which it was stirred for another 30 minutes at room temperature. 293 parts by weight of the addition product thus obtained were added dropwise under continued stirring to 108 parts by weight of a mixture of straight-chain secondary alcohols having 14 carbon atoms (OH number=250) within the space of 1 hour at a temperature of 20-25° C. During the reaction, the nascent hydrochloric acid was evacuated under low vacuum. Then the reaction product was subjected at a temperature of 25° C., for the purpose of subsequent degassing, to a water-jet vacuum pump for about ½ hour after which the reaction product was neuturalized in known manner with a solution of 97 parts by weight of 50% sodium hydroxide in 580 parts by volume of water to obtain a nearly colorless paste with 36.6% of washing active product, 1.5% of sodium chloride and 2.05% of an unsulfated substance. 0.6% of the unsulfated product was ketone which was already present in the initial alcohol.

EXAMPLE II 71 parts by weight of phosphorus pentoxide were added in small portions and with stirring to a mixture of 208 parts by weight of a commercial condensation product of two moles of ethylene oxide with one mole of a fatty alcohol mixture of 12 to 14 carbon atoms and 34.5 parts by weight of absolute ethanol while maintaining the temperature at 30-65° C. After the addition of phosphorus pentoxide was completed, the reaction mixture was heated at 75° C. for a period of 10 hours after which free ethanol could no longer be detected. 61.2 parts by weight of chlorosulfonic acid were added dropwise with stirring and cooling at a temperature of 20-23° C. to 156.7 parts by weight of the prepared fatty alcohol diglycolether-ethylphosphate mixture, after which the mixture was stirred thirty minutes longer at room temperature. 209 parts by weight of this addition compound were added dropwise over 15 minutes with continued stirring while maintaining a temperature of 25° C. to 108 parts by weight of a mixture of straight-chain secondary alcohols of 14 carbon atoms (OH number=250). At the same time, the nascent hydrochloric acid was evacuated under low vacuum and then the mixture was again degassed for about 1 hour at a temperature of 30° C. The resulting reaction product was neutralized with a solution consisting of 97 parts by weight of 50% sodium hydroxide in 580 parts by volume of water to obtain a nearly colorless paste containing 36.78% of washing active product, 1.25% of sodium chloride and 2.7% of unsulfated substance, of which again 0.6% was ketone in the starting material.

The advantages of the invention consist particularly in that in the sulfation, not only are sulfates of secondary alcohols formed but also the reaction mixture contains mixtures of acid mono or diesters of phosphoric acid with at least one fatty alcohol glycolether or their salts which possess, besides their excellent water solubility, a superior capacity for wetting, cleansing, dispersing and washing and they can be biologically degraded. Therefore, they do not interfere in the end product and do not have to be removed therefrom.

The following comparative test was conducted to demonstrate that sulfation with pure chlorosulfonic acid results in an end product with a high percentage of unsulfated product as compared to the clear, water-soluble product of the invention containing a very small amount of unsulfated product.

Comparison test 27.3 parts by weight of chlorosulfonic acid (105 mol percent), were added dropwise with stirring to 50 parts by weight, (0.223 mol), of a mixture of straight-chain secondary alcohols having 14 carbon atoms (OH number =250), at a temperature of 23-24° C. The nascent hydrochloric acid was evacuated with a water-jet vacuum pump.

(a) 33.9 parts by weight of the reaction product were neutralized with about 9 parts by weight of 50% sodium hydroxide in 79 parts by weight of water in the usual manner to obtain a milky emulsion containing 23% of washing active product, 0.2% of sodium chloride and a large amount, 11.8% of an unsulfated substance.

(b) 33.9 parts by weight of the said reaction product were also admixed with 54.9 parts by weight of the acid phosphoric acid ester obtained in Example 1, and then the mixture was neutralized with a solution of 22.4 parts by weight of 50% sodium hydroxide in 134 parts by weight of water to obtain a not clear, water-soluble paste containing 32.6% of washing active product, 0.2% of sodium chloride and 7.7% of an unsulfated substance.

In comparison with the product obtained in Example I, which has the same 32.6% of washing active substance, and 1.83% of unsulfated substance, the high content of 7.7% of unsulfated substance obtained by direct sulfation with chlorosulfonic acid establishes that secondary reactions occur to a large degree in the absence of the adducts of the present invention.

Various modifications of the process and products of the invention may be made without departing from the spirit or scope thereof.

I claim:
1. A process for the preparation of sulfates of secondary alkyl alcohols comprising reacting secondary alkyl alcohols of 8 to 22 carbon atoms at temperatures between about 20 to 40° C. with a sulfating complex of chlorosulfonic acid and at least one acid ester selected from the group consisting of mono- and di-esters of phosphoric acid having the formula

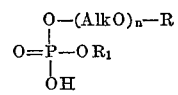

wherein R is an alkyl of 10 to 22 carbon atoms, $R_1$ is selected from the group consisting of hydrogen, methyl, ethyl and $-(Alk-O)_n-R$, Alk is an alkylene of 2 to 3 carbon atoms and $n$ is an integer from 1 to 10, and neutralizing the resulting reaction mixture.

2. The process of claim 1 wherein the sulfation reaction is effected under vacuum.

3. The process of claim 1 wherein $n$ is an integer from 2 to 6.

4. The process of claim 1 wherein R is an alkyl of 12 to 18 carbon atoms.

5. The process of claim 1 wherein Alk is ethylene.

6. The process of claim 1 wherein the sulfating complex is derived from equimolar amounts of chlorosulfonic acid and the reaction product of 3 moles of an alcohol glycol ether of the formula $$R-O-(CH_2-CH_2-O)_n-H$$

where R is an alkyl of 10 to 22 carbon atoms and $n$ is an integer from 2 to 4 and 1 mole of phosphorus pentoxide.

7. The product produced by the process of claim 1.

References Cited

FOREIGN PATENTS 942,130   11/1963   Great Britain.

OTHER REFERENCES

Gilbert: Sulfonation and Related Reactions, 352–353 (1965), Interscience Publishers.

DANIEL D. HORWITZ, Primary Examiner

U.S. Cl. X.R.

252—161, 152; 260—950